Figure 1:
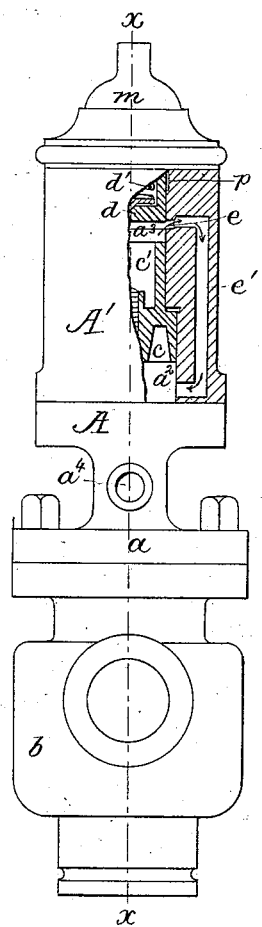

(No Model.)

W. B. MASON.
STEAM PUMP PRESSURE REGULATOR.

No. 334,079. Patented Jan. 12, 1886.

Witnesses.
Jas. J. Maloney.
H. P. Bates.

Inventor.
William B. Mason
by Jos. P. Livermore
Att'y.

N. PETERS, Photo-Lithographer, Washington, D. C.

UNITED STATES PATENT OFFICE.

WILLIAM B. MASON, OF BOSTON, MASSACHUSETTS, ASSIGNOR TO THE MASON REGULATOR COMPANY, OF SAME PLACE.

STEAM-PUMP-PRESSURE REGULATOR.

SPECIFICATION forming part of Letters Patent No. 334,079, dated January 12, 1886.

Application filed May 15, 1885. Serial No. 165,593. (No model.)

*To all whom it may concern:*

Be it known that I, WILLIAM B. MASON, residing in Boston, Suffolk county, State of Massachusetts, have invented an Improvement in Steam-Pump-Pressure Regulators, of which the following description, in connection with the accompanying drawings, is a specification—like letters on the drawings representing like parts.

The object of my invention, relating to a pressure-regulator for pumps, is to produce an apparatus for controlling the operation of a pump or forcing apparatus in accordance with the pressure of the fluid pumped or forced by it, automatically stopping the pump when the said pressure reaches a predetermined amount, and again setting the pump in operation when the pressure falls below the said amount.

The invention is especially intended to produce a regulator of extreme delicacy, so that the maximum pressure that can be produced by the pump will be defined within a limit not exceeding a pound to the square inch, the device being capable of operating much closer than this, so that the pressure may be regulated to within a small fraction of a pound to the inch.

The pressure-regulator consists, essentially, of a pressure chamber or cylinder containing a piston adapted to be operated in both directions by the pressure of the fluid forced by the pump, and operating in its movement to open and close the valve or otherwise operate the device which controls the application of power to the pump, the said main or actuating piston being itself governed by a secondary or controlling piston acted upon by the pumped fluid, tending to move it in one direction, and by a constant or predetermined force—such as that of a weight or spring—tending to move it in the opposite direction, the said secondary piston constituting a valve which controls the operation of the main piston, permitting the pumped fluid to move the latter, so as to close the engine-valve when the pressure of the pumped fluid becomes sufficient to overcome the constant force acting on the secondary or controlling piston. The said controlling-piston is arranged to operate with a minimum of friction, so that it is balanced with extreme delicacy between the constant force acting in one direction and the variable fluid-pressure acting in the other direction, and an extremely small movement of the said secondary piston is sufficient to insure the operation of the main piston in one or the other direction. By this construction the secondary piston has no mechanical work to do, and may consequently be balanced so delicately as to respond to an extremely small variation in pressure, while the entire pressure of the pumped fluid is rendered available for doing the mechanical work of opening and closing the engine-valve.

Figure 2:
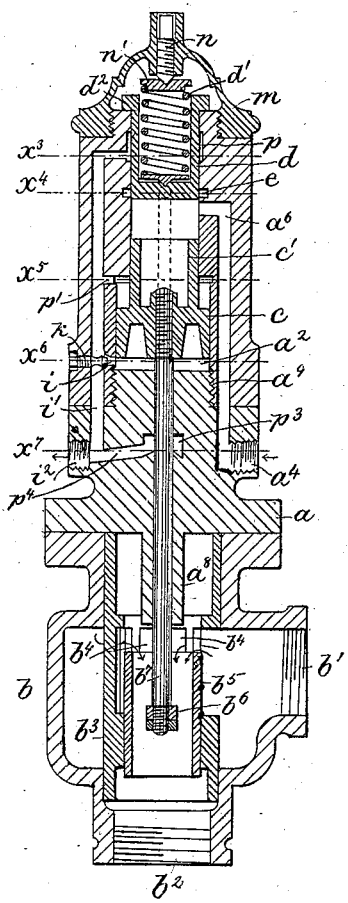
Figure 3:
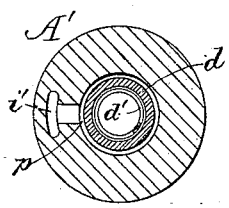
Figure 4:
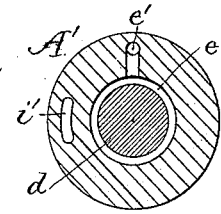
Figure 5:
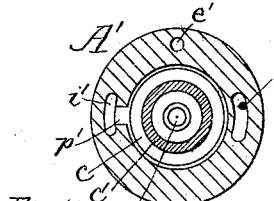
Figure 6:
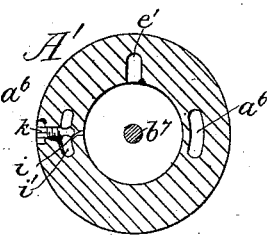
Figure 7:
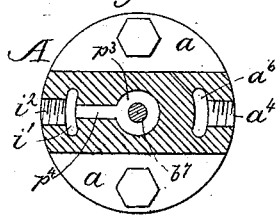

Figure 1 is an elevation, partly in section, of a pump-pressure regulator embodying this invention; Fig. 2, a vertical section thereof on line $x\ x$, Fig. 1; and Figs. 3 to 7, horizontal sections on lines $x^3\ x^4$, &c., of Fig. 2.

The base A of the regulator is shown as provided with a flange, $a$, adapted to be fastened upon the device for controlling the application of power to the engine—shown in this instance as a throttle-valve, $b$, which may be of any suitable or usual construction, having an inlet-opening, $b'$, and an outlet-opening, $b^2$, the latter communicating with the end of an internal sleeve or cylinder, $b^3$, having lateral openings $b^4$ communicating with the interior of the main shell of the valve and with the inlet-passage $b'$, the said sleeve $b^3$ containing the valve proper, $b^5$, which is tubular in form and has a longitudinal movement in the said sleeve, by which it controls the openings $b^4$ thereof, it being shown in Fig. 2 as in its lowest position, in which the steam or actuating-fluid enters the opening $b^4$ and passes down through the interior of the valve proper, $b^5$, and through the passage $b^2$ to the engine.

The operation of the apparatus does not depend at all upon the pressure at either side of the valve $b^5$, which is operated wholly independently of the pressure of the fluid controlled by it, which pressure may be regulated by another valve, governor, or device, according to the speed at which it is desired to have the engine or motor controlled by the valve operate.

The valve proper, $b^5$, is provided with a bridge, $b^6$, by which it is connected with the valve-stem $b^7$, which extends up into the interior of the pressure-regulator, and is connected with the main or actuating piston $c$ therein. The main portion of the said piston $c$ is fitted within a chamber, $a^2$, in the main body $a'$ of the regulator, and has an upward extension, $c'$, which fits within a chamber, $a^3$, of less diameter than the one $a^2$, being preferably one-half the sectional area of the latter, so that when the fluid-pressure is applied upon both sides of the piston it will tend to move it in one direction— namely, upward—when in the position shown in the drawings, with the same power that the piston would be moved in the opposite direrection if the fluid were acting only on the smaller area of the extension $c'$. The body of the regulator is provided with an inlet-passage, $a^4$, adapted to be connected by a pipe or otherwise with the delivery-pipe of the pump or fluid-forcing apparatus, the said passage being connected by a duct or port, $a^6$, with the interior of the smaller chamber $a^3$, which is thus always connected with the delivery-pipe of the pump, and constitutes a pressure-chamber, being affected by the same variations in pressure that occur in the said delivery-pipe. This pressure acts on the extension $c'$ of the main piston and tends to retain the valve $b^5$ open. The chamber $a^3$ also has fitted within it the secondary or controlling piston $d$, which is thus acted upon by the pressure in the said chamber derived from the pumped fluid introduced through the passages $a^4$ $a^6$, and which tends to move the said piston in one direction, or upward, when in the position shown in the drawings, and the said piston is acted upon in the opposite direction by a substantially constant or predetermined governing force, (shown in this instance as derived from a spring, $d'$, although it is obvious that a weight or other equivalent might be used instead.) The secondary piston is provided with a stop (shown as a flange or shoulder, $d^2$,) which limits its movement under the action of the predetermined or governing force, the piston remaining with the said flange resting on the upper end of the body of the regulator while the said force predominates. As soon, however, as the force of the pumped fluid acting upon the said piston becomes greater than the predetermined or governing force acting thereon, it will move the said piston, and in the said movement the end of the latter will pass or uncover an annular groove, $e$, in the side of the chamber $a^3$, thus permitting the fluid to enter the said groove or annular opening, which is connected by a passage, $e'$, with the larger chamber $a^2$ below the main piston, as best shown in Fig. 1, thus permitting the fluid to act on the under side of the larger portion of the main piston as well as on the extension $c'$, so that, owing to the greater area of the former, the main piston and connected valve $b^5$ will be moved upward and the said valve closed, thus immediately stopping the operation of the pump when the pressure reaches the desired amount, determined by the force applied through the spring $d'$ or otherwise to the controlling-piston $c$. Thus, assuming that the area of the projection $c'$ of the main piston is sufficient to do the work of moving the valve, and that the area of the larger portion of the said piston is double that of the said projection, it follows that the entire fluid-pressure on such area is rendered available for moving the valve. When, owing to the withdrawal of fluid or for other reason, the pressure in the delivery-pipe of the pump falls below the predetermined maximum amount, the governing force on the piston $d$ will predominate, moving it downward to the position shown in Fig. 2, so that it will close the port $e'$ or cut off the connection between the annular groove or opening $e$ and the interior of the cylinder $a^3$, so that the fluid will no longer be admitted to the chamber $a^2$ below the main piston. In order to permit the liquid that is in the chamber $a^2$ to escape after the passage $e'$ is thus closed, so that the pressure acting on the extension $c'$ may move the piston and open the valve $b^5$, the said chamber $a^2$ is provided with a small outlet-passage, $i$, communicating with an outlet-passage, $i'$, in the body of the regulator, having an opening, $i^2$, which may be connected with a waste-pipe, or, preferably, with the suction or supply pipe of the pump when not under pressure, so that the liquid will gradually escape from the chamber $a^2$, permitting the main piston to move downward, and the fluid in escaping acts as a cushion for retarding the said movement, so that the valve $b^5$ will not be opened too suddenly. The outlet-passage $i$ from the chamber $a^2$ is of far less capacity than the passage $e'$, which admits the fluid to the said chamber $a^2$, so that it does not appreciably diminish the pressure in the said chamber $a^2$ when the passage $e'$ is open or in communication with the chamber $a^3$, and when the parts are in the position shown in Fig. 1, with the pump stopped, there will be a constant, though extremely small, flow of fluid through the passage $e'$ and out through the escape-pipe. The effective area of the passage $i$ may be controlled by a valve, $k$. (Shown as having a threaded shank or stem, and preferably a squared head, so that it may be turned by a suitable key.) The upper end of the body of the regulator is closed by a cap, $m$, and when a spring is used, as shown, to produce the governing force on the secondary piston, an adjusting device may be provided, consisting, as shown in this instance, of a screw, $n$, bearing on a follower, $n'$, resting on the end of the spring $d'$. The said screw will preferably have a squared head, which may be of the same size as that of the valve $k$, and will preferably be inclosed in a socket or recess, so that it cannot readily be tampered with, although it may be easily operated by a suitable key or socket-wrench, provided for the purpose. Thus, by turning the screw $n$, the maximum pressure at which the pump will cease to work may be regulated as required.

In order to obviate the necessity of packing the moving parts, and thus increasing the friction of their movement, which might interfere with the delicacy of the operation, means are provided for removing the fluid which leaks by the movable pistons or rods without interfering with their operation. Thus the chamber $a^3$ is provided with a groove, $p$, surrounding the secondary piston and connected with the outlet-passage $i'$, so that the liquid which may leak around the lower portion of the said piston will escape through the passage $i'$ without passing up by the top of the piston. In a similar manner the portion of the chamber $a^2$ above the larger head of the main piston is provided with an escape-passage, $p'$, also communicating with the outlet-passage $i'$, so that the liquid which leaks downward around the projection $c'$ or upward around the main portion of the piston $c$ will escape and produce no pressure on the upper surface of the main portion, other than that which acts directly on the extension $c'$. The escape-passage $i$ will be large enough to carry off the liquid which may leak around the lower end of the secondary piston into the port $e$, so that no effect will be produced on the main piston by such leakage, although the latter will respond immediately when the port $e'$ is actually opened by the upward movement of the secondary piston. The stem $b^7$ of the valve $b^5$ will be fitted accurately in the bore of the base portion of the regulator, which will preferably be provided with a sleeve, $a^8$, to form a long bearing for the said stem, and the said base portion will be provided with an annular chamber, $p^3$, connected by a passage, $p^4$, with the outlet $i^2$, the bottom of the said chamber and the passage $p^4$ being inclined, as shown in Fig. 2, so as to cause the fluid which may enter to flow downward toward the outlet without any tendency to pass downward along the stem $b^7$ into the valve-chamber. The main body of the regulator is shown as made in two parts, A A', connected by screw-threads $a^9$, as shown in Fig. 2, this construction being adapted to facilitate the boring of the cylindrical chambers in the upper part, A', of the said body.

In regulators, as heretofore made, for controlling the operation of a pump or forcing apparatus in accordance with the pressure of the fluid forced by it, the valve or controlling device of the engine or forcing apparatus has usually been operated directly by a predetermined force tending to open it and the opposing force of the fluid tending to close it, and by this method the fluid first has to acquire sufficient pressure to overcome the opposing force, and then must have its pressure further increased to move the valve, and as the mechanical force required to move the valve depends on many variable elements, it is impossible to operate it within small limits of change in pressure. The main valve is thus moved in either direction by the slight preponderance of one or the other of two opposing and nearly-balanced forces, and its operation will consequently be slow and vacillating when the equilibrium of said forces is only slightly disturbed. By the present invention, however, the secondary valve practically floats in a film of fluid, and is ready to respond to the slightest change in pressure, moving immediately when the balance between the pressure of the fluid on the one end and the governing force or weight on the other end is disturbed; but the main valve, on the contrary, is operated by the entire fluid-pressure after the equilibrium between the forces acting on the secondary valve has been disturbed, and consequently the operation of the main valve will be prompt and decisive the moment that the equilibrium of the forces acting on the secondary valve is disturbed, and will be independent of the actual amount of disturbance of such equilibrium.

The invention is applicable to other purposes besides regulating steam-pumps or fluid-forcing apparatus, and is not limited to the precise construction shown, as various modifications may be made in the construction, although that shown is believed to be simplest and best adapted for the purpose intended.

Instead of having a constant exhaust from the larger chamber $a^2$ of the regulator through the passage $i$, the exhaust might also be controlled by the secondary piston, being opened only when the connecting-passage $e'$ or inlet to the larger chamber $a^2$ is closed; and, instead of having an independent exhaust-passage, $i$, for the main piston, the fluid below it, when in the position shown in Fig. 1, might exhaust by leaking around the piston and escaping through the passage $p'$, or by leaking around the upper part of the piston-rod and escaping through the passage $p^4$; but in this construction the exhaust would not be capable of regulation, as shown, and the speed of opening the valve $b^5$ would have to be determined once for all in the construction of the apparatus by affording greater or less leakage around the piston or its rod, while by the present construction the effective area or capacity of the exhaust-passage may be regulated by the valve $k$, thus enabling the speed with which the valve $b^5$ is opened to be varied and regulated as desired by the operator.

I claim—

1. A pressure-regulator for fluid-forcing apparatus, comprising a main piston or actuating device for the controlling device of the forcing apparatus, a pressure-chamber containing fluid under a pressure affected by and corresponding with that of the fluid delivered by the forcing apparatus, and a secondary piston acted upon in one direction by a predetermined governing force and in the other direction by the varying pressure of the fluid in the pressure-chamber, the said secondary piston, when moved by the preponderance of the fluid-pressure over the governing force, permitting the said fluid-pressure to be applied to the main piston, substantially as and for the purpose set forth.

2. The combination of a main piston having an extenion of less area constantly acted upon by fluid-pressure with a secondary piston disconnected from the main piston and acted upon in one direction by a variable pressure and in the other direction by a substantially constant force of predetermined amount, the said secondary piston constituting a valve which controls the application of fluid-pressure to the main piston, which pressure, when applied, acts on the full area of the main piston in the direction opposite to that acting on the smaller extension thereof, substantially as and for the purpose described.

3. In a regulator operating by variable fluid-pressure, the main body provided with chambers of different sectional area and with inlet and outlet passages, the former communicating with the smaller chamber and containing the fluid having variable pressure, combined with a main piston working in the larger chamber and having an extension working in the smaller chamber, and a secondary piston or valve acted upon by the variable fluid-pressure and an opposing governing force, and controlling the admission of fluid to the larger chamber of the regulator, substantially as described.

4. In a regulator operating by variable fluid-pressure, the main body provided with chambers of different sectional area and with inlet and outlet passages, the former communicating with the smaller chamber and containing the fluid having variable pressure, combined with a main piston working in the larger chamber and having an extension working in the smaller chamber, and a secondary piston or valve acted upon by the variable fluid-pressure and an opposing governing force, the regulator being provided with a connecting-passage between the larger and smaller chambers, controlled by the secondary piston or valve, and with an outlet-passage from the larger chamber of less capacity than the said connecting-passage, substantially as and for the purpose described.

5. In a regulator operating by variable fluid-pressure, the main body provided with chambers of different sectional area and a connecting-passage between them, and with inlet and outlet passages, the former communicating with the smaller chamber and the latter communicating with an outlet-passage from the larger chamber, combined with a main piston working in the larger chamber and having an extension working in the smaller chamber, and a secondary piston controlling the flow of fluid through the connecting-passage between the said chambers, and a valve governing the outlet-passage of the larger chamber, substantially as and for the purpose set forth.

In testimony whereof I have signed my name to this specification in the presence of two subscribing witnesses.

WILLIAM B. MASON.

Witnesses:
 JOS. P. LIVERMORE,
 H. P. BATES.